United States Patent [19]

Hörlein et al.

[11] 3,857,836

[45] Dec. 31, 1974

[54] HERBICIDAL AGENTS

[75] Inventors: Gerhard Hörlein, Frankfurt am Main; Hubert Schönowsky, Neu-Isenburg, both of Germany; Georg Gustav Gassner, deceased, late of Kelkheim/Taunus, Germany by Margot Gassner née Heinemann, heiress; Peter Langelüddeke, Diedenbergen/Taunus; Adolf Studeneer, Kelkheim/Taunus, both of Germany

[73] Assignee: Hoechst Aktiengesellschaft vormals, Frankfurt/Main, Germany

[22] Filed: Mar. 22, 1972

[21] Appl. No.: 237,127

[30] Foreign Application Priority Data

Mar. 23, 1971 Germany............................ 2113978

[52] U.S. Cl............ 260/240 G, 260/564 RF, 71/88, 71/94, 71/95

[51] Int. Cl............................................ C09b 23/00

[58] Field of Search ...... 260/564 R, 564 RF, 239 B, 260/239 R, 247.1 R, 247.5 R, 293.73, 393.79, 326.82, 326.85, 244 R, 240 G

[56] References Cited

UNITED STATES PATENTS

| | | | |
|---|---|---|---|
| 3,189,648 | 6/1965 | Gerjovich......................... | 260/564 R |
| 3,557,128 | 1/1971 | Pallos et al...................... | 260/564 R |

*Primary Examiner*—Leon Zitver
*Assistant Examiner*—Gerald A. Schwartz
*Attorney, Agent, or Firm*—Curtis, Morris & Safford

[57] ABSTRACT

This invention is concerned with certain arylformamidine compounds and their application as herbicidal agents, the general formula of said compounds being

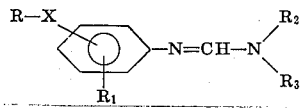

wherein R, $R_1$ to $R_3$ and X have the meaning set forth in the specification.

11 Claims, No Drawings

HERBICIDAL AGENTS

The present invention provides arylformamidines of the general formula

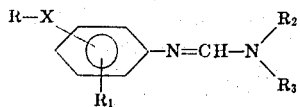

where
- R is an alkyl radical substituted by fluorine and/or chlorine and having from 1 to 3 carbon atoms and at least one hydrogen atom, or an alkenyl radical substituted by fluorine and/or chlorine and having 2 carbon atoms, which also contains at least one hydrogen atom;
- $R_1$ is hydrogen, chlorine, methyl, methoxy, or trifluoromethyl;
- $R_2$ and $R_3$ each is alkyl having from 1 to 3 carbon atoms; or
- $R_2$ and $R_3$ represent an alkylene or an oxalkylene radical having from 4 to 6 carbon atoms, and
- X is oxygen or sulfur;

and the inorganic salts thereof.

Preferred compounds of the present invention are those containing at least one fluorine or chlorine atom linked to each carbon atom in R, and especially those where in R all hydrogen atoms except one are substituted by fluorine and/or chlorine and, optionally, by $CF_3$. There are furthermore preferred compounds where $R_2$ is the same as $R_3$. Such compounds have for example the formula

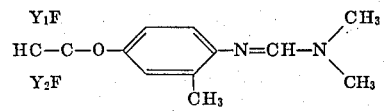

or

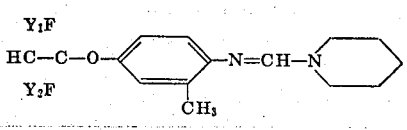

where $Y_1$ stands for F or Cl and $Y_2$ for F or Cl or $CF_3$.

In compounds in which $R_2$ and $R_3$ together with the N-atom form a ring, the preferred oxalkylene radical is the $-CH_2-CH_2O-CH_2-CH_2-$ radical.

As inorganic salts, the hydrochlorides are preferred. There may be used also other salts, such as sulfates, nitrates, chlorates, perchlorates or phosphates.

As alkylation agent (cf. process II and Example 2), dimethylsulfate is preferred.

The preferred formimino esters used as starting substances are alkyl esters having from 1 to 3 carbon atoms, especially the methyl ester.

The present invention provides also processes for the preparation of these compounds which comprise
1. reacting halogeno-alkoxy-(thio)anilines or halogeno-vinyloxy-(thio)anilines with
   a. N-formyl-dialkylamines and inorganic acid chlorides, or
   b. corresponding N-formyl-dialkylamines and alkylation agents;
2. reacting N-halogeno-alkoxy-(thio)phenyl- or N-halogenovinyloxy-(thio)phenyl-O-alkyl formimino esters with dialkylamines or secondary cyclic amines;
3. reacting halogeno-alkoxy-(thio)phenyl- or halogeno-vinyloxy(thio)phenyl-isocyanates with N-formyl-dialkylamines; and isolating the amine which has formed in every case.

Subject of the present invention is further the use of these compounds as agents for the selective combating of undesired plant growth.

The processes for the preparation of the compounds of the invention are explained as follows by way of the formula schemes of syntheses of special compounds:

(I)

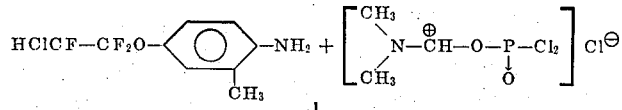

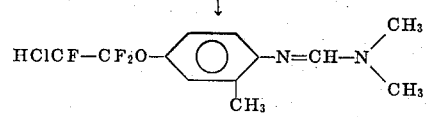

(II)

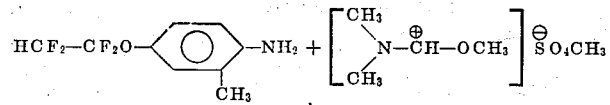

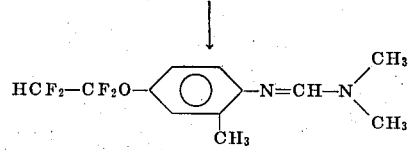

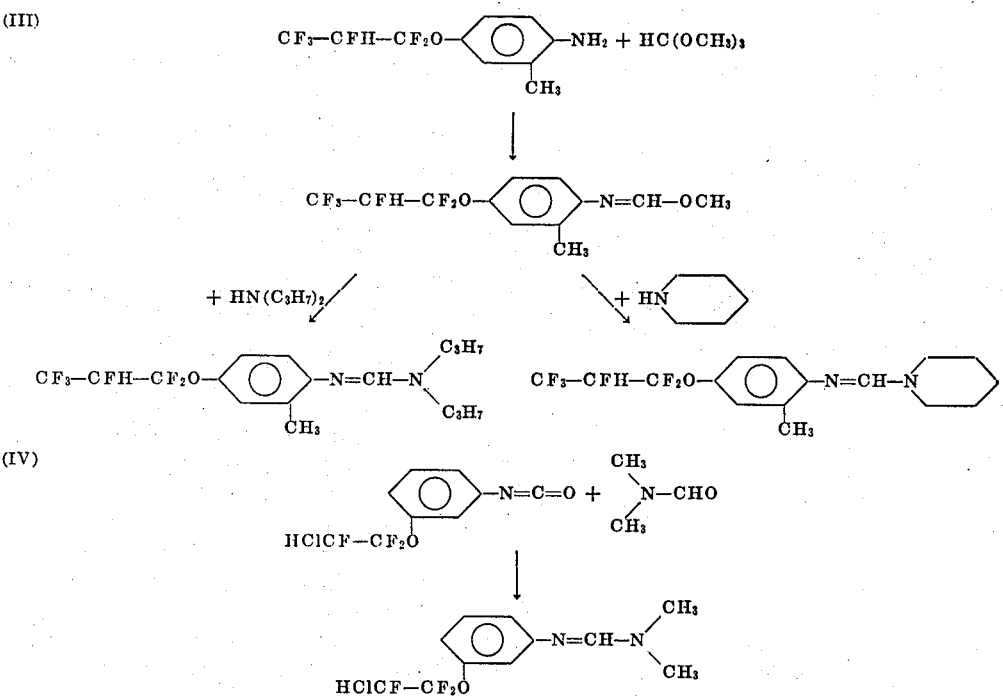

The reaction of the halogeno-alkoxy-(thio)anilines with N-formyl-dialkylamines and phosphorus oxychloride is carried out at temperatures of from 20° to 150°C, an excess of the corresponding dialkylformamide serving as solvent, or, optionally, in the presence of an aprotic polar solvent, for example acetonitrile. It is unimportant whether at first the dialkylformamide/-phosphorus oxychloride complex is prepared and then reacted with the different halogeno-alkoxy-(thio)anilines, or whether the three compounds are added to each other in any desired sequence.

Instead of the phosphorus oxychloride, also other inorganic acid halides, for example thionyl chloride or phosgene, or oxalyl chloride may be employed. After complete reaction, the free amidine base can be separated by adding an adequate amount of strong base, for example triethylamine or sodium hydroxide solution, and then isolated in known manner, preferably by distillation.

The substituted phenylformamidines may also be formed in the presence of alkylation agents, for example dimethylsulfate, instead of employing acid chlorides.

The N-halogeno-alkoxy-(thio)phenyl-O-alkyl-formimino esters obtained by reaction of the halogeno-alkoxy-(thio)anilines with ortho-formic acid trialkyl esters react with primary and secondary aliphatic amines or secondary cyclo-aliphatic amines at temperatures of from 60° to 200°C, preferably without addition of a solvent; the amine may be employed in excess as compared with the formimidate. The halogeno-alkoxy-(thio)phenyl-isocyanates are converted into the corresponding amidines in an excess of dialkylformamide at temperatures of from 60° to 200°C.

The new halogeno-alkoxy-(thio)phenyl-formamidines are stable oils which can be further purified by a vacuum distillation.

The amidinium salts can be obtained in known manner by neutralization of the base with an acid.

The halogeno-alkoxy-(thio)anilines required as starting substances are prepared according to known methods by reaction of halogeno-methanes, halogeno-ethanes, halogeno-ethylenes with nitrophenols and subsequent reduction of the nitro group (J. org. Chem. 25 (1960) 2009, Ber. 96 (1963) 52; Bull. Soc. chim. France (5) 1957, 581; J. org. Chem. 29 (1964), 5).

The new compounds have a good activity against weeds, and they are superior to proved herbicides, for example molinate, nitrofen and trifluralin, with respect to their properties preserving various important crop plants, such as cereals, rice, corn, sugar beet, cotton or leguminosae.

The compounds of the invention are very active especially against barnyard grass (Echinochloa crus galli), a weed in rice crops, which weed can be combated only with great difficulty. They are furthermore also very active against other grass weeds and they have a long-time efficacy against weeds especially in sugar beet crops, while they effectively spare the sugar beet plants.

The compounds of the present invention may be applied in the form of wettable powders, emulsifiable concentrates, spray solutions, dusting powders or granules. Wettable powders are preparations which are homogeneously dispersible in water, and which, in addition to the active ingredient and a diluent or inert substance, contain also one or more wetting agents, for example polyoxethylated alkylphenols, polyoxethylated oleyl or stearyl amines, or alkyl- or alkylphenyl-sulfonates, and one or more dispersing agents, for example the sodium salts of ligninsulfonic acid, 2,2'-dinaphthyl-methane-6,6'-disulfonic acid, dibutyl-naphthalene-sulfonic acid, or oleylmethyltaurine.

Emulsifiable concentrates may be obtained by dissolving the active ingredient in an organic solvent, for example butanol, cyclohexanone, dimethylformamide, xylene, or higher boiling aromatics. In order to obtain a good suspension or emulsion in water, one or more further wetting agents from the above series should be used.

Dusting powders are obtained by grinding the active ingredient with one or more finely divided solid substances, for example talcum or natural aluminates, for example kaolin, bentonite, pyrophyllite or diatomaceous earth.

Spraying solutions, commercially available as aerosol sprays, contain the active ingredient dissolved in an organic solvent, and a propellant, for example a mixture of hydorcarbon fluorides.

Granules may be obtained either by atomizing the active ingredient through a nozzle onto an absorptive granulated inert material, or by applying a concentrate of the active ingredient by means of an adhesive, for example polyvinyl alcohol, the sodium salt of polyacrylic acid or mineral oils, onto the surface of a carrier, for example, sand, kaolinites or granulated inert materials. The active substances may also be granulated by the methods used in the preparation of fertilizer granulated material, if desired in admixture with one or more fertilizers.

The concentration of the active ingredients in the preparations may vary considerably. For example, in wettable powders the concentration of active ingredient may vary within the range of from about 10 to 95 percent, the remaining amount consisting of additives. In emulsifiable concentrates, the concentration of active ingredient may vary in the range of from about 10 to 80 percent. Dusting powders generally contain from 5 to 20 percent, spray solutions from about 2 to 20 percent, of active ingredient.

In the case of granules, the content of active ingredient partially depends on the fact whether the active compound is liquid or solid and on what granulating agents, fillers and other additives are used.

For practical applications, the concentrates are usually diluted in usual manner, for example, in the case of wettable powders and emulsifiable concentrates, by means of water. Dust formulations, granulated preparations and spray solutions are not diluted with further inert substances before their application. The amount of active ingredient required for application varies in accordance with the external conditions, for example temperature and moisture; generally from 0.015 to 0.25 g/m², preferably from 0.03 to 0.12 g/m², of active substance is used. Furthermore, the compounds of the invention may be combined with other herbicides and/or soil insecticides. Known herbicides which may be suitable for combination with the compounds used in the process of the invention are, for example:

| | |
|---|---|
| Urea derivatives: | norea (N-(hexahydro-4,7-methane-indan-5-yl)-N',N'-dimethyl urea) cycluron (N-Cyclooctyl-N',N'-dimethyl urea) methabenzthiazuron (N-(2-benzo-thiazolyl)-N',N'-dimethyl urea) linuron, chloroxuron, monolinuron, fluometuron, diuron; |
| Triazine derivatives: | simazine, atrazine, ametryne, prometryne, desmetryne, methoprotryne; |
| Uracil derivatives: | lenacil, bromacil; |
| Pyrazon derivatives: | 1-phenyl-4-amino-5-chloro-pyrazidone-(6); |
| Growth-promoting preparations: | 2,4-dichloro-phenoxy-acetic acid, 4-chloro-2-methyl-phenoxy-acetic acid, 2,4,5-trichloro-phenoxy-acetic acid, 4-chloro-2-methyl-phenoxy-butyric acid, 2,3,6-trichlorobenzoic acid, 2-(2-methyl-4-chlorophenoxy)-propionic acid; |
| Carbamic acid derivatives: | barban, phenmedipham, triallate, diallate, vernolate, cycloate (N-ethyl-N-cyclohexyl-thiol-ethylcarbamate) molinate (hexahydro-1-H-azepine-1-carbamic acid-thiol-ethyl ester) EPTC (N,N-dipropyl-thiol-ethyl-carbamate) chlorpropham and Swep; |
| Dinitrophenol derivatives: | dinitro-o-cresol, dinitro-sec.-butyl-phenol or dinoseb, dinoseb-acetate; |
| Chlorinated aliphatic acids: | sodium trichloro-acetate, dalapon (sodium salt of 2,2-dichloropropionic acid), amiben (3-amino-2,5-dichloro-benzoic acid) picloram (4-amino-3,5,6-trichloro-pyridine-carboxylic acid; |
| Amides: | diphenamide, N,N-diallylchloro-acetamide, carbetamide (2-(phenylcarbamoyloxy)-N-ethylpropionamide) N-(1,1-dimethylpropinyl)-3,5-dichloro-benzamide; |
| Dipyridilium derivatives: | paraquat, diquat, morfamquat; |
| Anilides: | N-(3,4-dichlorophenyl)-methacryl-amide, propanil, solan, monalide, 2-chloro-2',6'-diethyl-N-(methoxymethyl)-acetanilide, propachlor, methacryl-3,4-dichloro-anilide; |
| Nitriles: | dichlobenil, ioxynil; |
| Other preparations: | fluorenol, monosodium-methyl-arsonate, trifluralin, endothal (3,6-endo-oxo-hexa-hydrophthalic acid), nitrofen (2,4-dichloro-phenyl-4'-nitrophenyl ether), pyriclor (2,3-4-trichloro-4-pyridinol), α-(2,2,2-trichlorethyl)-styrene, bensulide and aminotriazol. |

Another application form for the active substances used in the process of the invention is in a mixture with one or more fertilizers, thus obtaining fertilizing agents which simultaneously have a herbicidal action.

The following Examples illustrate the invention.

EXAMPLES OF PREPARATION

EXAMPLE 1

To a solution of 41 g (0.15 mole) of 2-methyl-4-(1', 1', 2', 3', 3', 3'-hexafluoro)propoxy-aniline in 75 ml of dimethylformamide, 23 g (0.15 mole) of phosphorus oxychloride were added dropwise with agitation in such a manner that the reaction temperature did not exceed a range of from 60° to 70°C. After this addition of phosphorus oxychloride, the reaction mixture was maintained at this temperature range for about a further 2 hours.

With cooling by ice, the mixture was stirred into about 100 ml of a 33 percent sodium hydroxide solution, possibly precipitated inorganic salts were dissolved by dilution with water, and the oily free formamidine which had formed was separated from the aqueous phase by means of toluene. The toluene solution was washed with water, dried and concentrated in a water jet vacuum. After a small amount of first runnings, the residue (44 g) distilled over at constant temperature.

Yield: 39 g
Boiling point: 135° – 136°C (2.6 mm Hg)

Analysis:

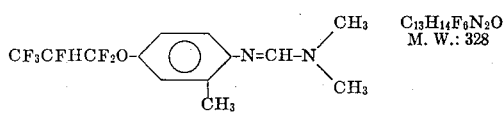

$C_{13}H_{14}F_6N_2O$
M.W.: 328

Calc.: 47.5% C; 4.3% H; 8.5% N
Found: 47.6% C; 4.4% H; 8.8% N

EXAMPLE 2

19 g (0.15 mole) of dimethylsulfate were added dropwise to 11 g (0.15 mole) of dimethylformamide, and the mixture was maintained for 1 hour at 60°C. After cooling to room temperature, 33.5 g (0.15 mole) of 2-methyl-4-(1′, 1′, 2′, 2′-tetrafluoroethoxy)aniline, dissolved in 25 ml of methylene chloride, were also added, and the whole was maintained for 1 hour at 40°C with agitation. Subsequently, 15 g of triethylamine in 25 ml of methylene chloride were added, water was added to the reaction mixture, the organic phase was separated, dried over $Na_2SO_4$, and, after having distilled off the methylene chloride, the reaction product was separated by a fractional distillation in an oil pump vacuum.

Yield: 31 g
Boiling point: 106° – 108°C (0.3 mm)

Analysis:

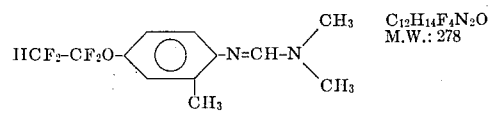

$C_{12}H_{14}F_4N_2O$
M.W.: 278

Calc.: 10.0% N; 27.3% F
Found: 9.8% N; 27.0% F

EXAMPLE 3

A mixture of 31.5 g (0.1 mole) of N-2-methyl-4-(1′, 1′, 2′, 3′, 3′, 3′-hexafluoro-propoxy)-phenyl-O-methyl-formimino ester and 42.5 g (0.5 mole) of piperidine was refluxed in a flask with a column attached to its head until methanol began to split off. The methanol was successively distilled off via the column as it was formed. After about 3 hours, the piperidine which was not consumed was eliminated by means of a water jet vacuum. The residue (36.5 g) was fractionally distilled via a column by means of an oil pump vacuum. After 2 g of first runnings (boiling point 128° – 129°C at 0.01 mm Hg), the product uniformly distilled over.

Yield: 32g
Boiling point: 130°C (0.01 mm)

Analysis:

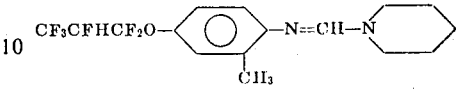

$C_{16}H_{18}F_6N_2O$
M.W.: 368

Calc.: 52.2% C; 4.9% H; 7.6% N
Found: 52.2% C; 5.0% H; 7.7% N

EXAMPLE 4

100 ml of dry dimethylformamide free from amines and 39.8 g (0.15 mole) of 2-methyl-4-(1′, 1′, 2′-trifluoro-2′-chloroethoxy)-phenyl-isocyanate were refluxed with exclusion of moisture until the formation of carbon dioxide had come to an end. Subsequently, unreacted dimethylformamide was eliminated in a water jet vacuum, and the residue was fractionally distilled via a column in an oil pump vacuum. After a small amount of first runnings, the product uniformly distilled over.

Yield: 40.5 g
Boiling point: 146° – 147°C (1.0 mm)

Analysis:

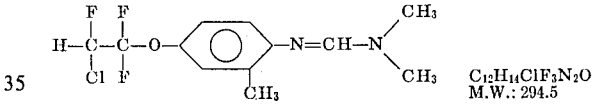

$C_{12}H_{14}ClF_3N_2O$
M.W.: 294.5

Calc.: 48.8% C; 4.7% H; 9.5% N
Found: 48.7% C; 4.7% H; 9.6% N

In the following Tables, there are listed further compounds in accordance with the invention which have been prepared according to one of the Examples 1 to 4 (column 3).

Column 1 shows the number, column 2 the compound, column 4 the starting substances, R being the substituted phenyl group of the final product, column 5 the boiling point and the corresponding pressure, and columns 6 to 8 contain the analysis data.

| No. | Final product | Prepared according to— | Reactants | B.P., °C (mm. Hg) | Analysis Calc. | | Found |
|---|---|---|---|---|---|---|---|
| 5 | (M.W. 356) 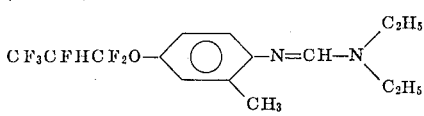 | 1 | $R-NH_2 + OHC-N(C_2H_5)_2 + POCl_3$ | 151-152 (3.0) | 50.6 | C | 50.7 |
| | | | | | 5.1 | H | 5.2 |
| | | | | | 7.9 | N | 8.6 |
| 6 | (M.W. 384) 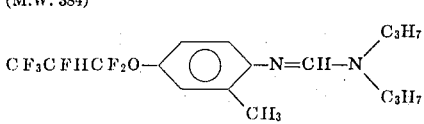 | 3 | $R-N=CH-OCH_3 + HN(C_3H_7)_2$ | 71-73 (0.01) | 53.1 | C | 48.7 |
| | | | | | 5.7 | H | 4.4 |
| | | | | | 7.3 | N | 5.0 |

Table — Continued

| No. | Final product | Prepared according to— | Reactants | B.P., °C. (mm. Hg) | Analysis Calc. | Analysis Found |
|---|---|---|---|---|---|---|
| 7 | CF₃CFHCF₂O—⟨◯⟩(CH₃)—N=CH—N⟨pyrrolidine⟩ (M.W. 382) | 3 | R—N=CH—OCH₃ + HN⟨⟩ | 135 (0.05) | 50.8 C<br>4.5 H<br>7.9 N | 50.8<br>4.6<br>7.9 |
| 8 | CF₃CFHCF₂O—⟨◯⟩(CH₃)—N=CH—N⟨hexamethyleneimine⟩ (M.W. 370) | 3 | R—N=CH—OCH₃ + HN⟨⟩ | 135–136 (0.01) | 53.4 C<br>5.2 H<br>7.3 N | 53.8<br>5.4<br>7.8 |
| 9 | CF₃CFHCF₂O—⟨◯⟩(CH₃)—N=CH—N⟨morpholine⟩O (M.W. 264) | 3 | R—N=CH—OCH₃ + HN⟨⟩O | 137 (0.01) | 48.7 C<br>4.3 H<br>7.6 N | 48.9<br>4.5<br>7.7 |
| 10 | H—CF₂CF₂O—⟨◯⟩—N=CH—N(CH₃)₂ (M.W. 292) | 1 | R—NH₂ + OHC—N(CH₃)₂ + POCl₃ | 131 (0.2) | 49.9 C<br>4.5 H<br>10.6 N | 49.7<br>4.3<br>10.7 |
| 11 | H—CF₂CF₂O—⟨◯⟩—N=CH—N(C₂H₅)₂ (M.W. 280.5) | 1 | R—NH₂ + OHC—N(C₂H₅)₂ + POCl₃ | 120 (0.005) | 53.4 C<br>5.5 H<br>9.6 N | 52.9<br>5.5<br>9.0 |
| 12 | HCFClCF₂O—⟨◯⟩—N=CH—N(CH₃)₂ (M.W. 322.5) | 4 | R—N=C=O + OHC—N(CH₃)₂ | 147 (1.7) | 47.1 C<br>4.3 H<br>10.0 N | 46.9<br>4.4<br>9.8 |
| 13 | HCFClCF₂O—⟨◯⟩(CH₃)—N=CH—N(C₂H₅)₂ (M.W. 350.5) | 1 | R—NH₂ + OHC—N(C₂H₅)₂ + POCl₃ | 165 (2.8) | 52.1 C<br>5.6 H<br>8.7 N | 52.1<br>5.7<br>8.6 |
| 14 | HCFClCF₂O—⟨◯⟩—N=CH—N(C₃H₇)₂ (M.W. 320.5) | 3 | R—N=CH—OCH₃ + HN(C₃H₇)₂ | 130–136 (0.1) | 54.7 C<br>6.3 H<br>8.0 N | 54.6<br>6.3<br>8.2 |
| 15 | HCFClCF₂O—⟨◯⟩(CH₃)—N=CH—N⟨pyrrolidine⟩ (M.W. 334.5) | 3 | R—N=CH—OCH₃ + HN⟨⟩ | 157 (0.5) | 52.4 C<br>5.0 H<br>8.7 N | 52.4<br>5.1<br>9.1 |
| 16 | HCFClCF₂O—⟨◯⟩(CH₃)—N=CH—N⟨piperidine⟩ (M.W. 348.5) | 3 | R—N=CH—OCH₃ + HN⟨⟩ | 175 (0.15) | 53.8 C<br>5.4 H<br>8.4 N | 53.8<br>5.7<br>8.3 |
| 17 | HCFClCF₂O—⟨◯⟩(CH₃)—N=CH—N⟨hexamethyleneimine⟩ (M.W. 336.5) | 3 | R—N=CH—OCH₃ + HN⟨⟩ | 162 (0.01) | 55.1 C<br>5.7 H<br>8.0 N | 55.2<br>5.9<br>8.1 |
| 18 | HCFClCF₂O—⟨◯⟩(CH₃)—N=CH—N⟨morpholine⟩O | 3 | R—N=CH—OCH₃ + HN⟨⟩O | 153 (0.01) | 49.9 C<br>4.8 H<br>8.3 N | 49.9<br>5.0<br>8.3 |

Table — Continued

| No. | Final product | Prepared according to— | Reactants | B.P., °C. (mm. Hg) | Analysis Calc. | Analysis Found |
|---|---|---|---|---|---|---|
| 19 | (M.W. 294.5) $CH_3$—C6H3(OCF_2CFClH)—N=CH—N(CH_3)_2 | 1 | R—NH_2 + OHC—N(CH_3)_2 + POCl_3 | 144 (1.6) | 48.8 C / 4.8 H / 9.5 N | 48.9 / 4.8 / 9.6 |
| 20 | (M.W. 296.5) HCFClCF_2S—C6H4—N=CH—N(CH_3)_2 | 1 | R—NH_2 + OHC—N(CH_3)_2 + POCl_3 | 165 (1.0) | 44.6 C / 4.1 H / 9.5 N | 44.6 / 4.1 / 9.8 |
| 21 | (M.W. 364.5) HCFClCF_2S—C6H3(CF_3)—N=CH—N(CH_3)_2 | 1 | R—NH_2 + OHC—N(CH_3)_2 + POCl_3 | 170–180 (0.8) | 37.9 C / 2.9 H / 7.4 N | 40.7 / 3.2 / 8.1 |
| 22 | (M.W. 367.5) HCFClCF_2S—C6H3(Cl)—N=CH—N(CH_3)_2·HCl | 1 | R—NH_2 + OHC—N(CH_3)_2 + POCl_3 | (a) | 35.9 C / 3.3 H | 36.0 / 3.4 |
| 23 | (M.W. 297) H—CCl_2CF_2O—C6H4—N=CH—N(CH_3)_2 | 1 | R—NH_2 + OHC—N(CH_3)_2 + POCl_3 | 136–138 (0.01) | 44.4 C / 4.0 H / 9.4 N | 45.3 / 4.3 / 9.3 |
| 24 | (M.W. 325) H—CCl_2CF_2O—C6H4—N=CH—N(C_2H_5)_2 | 1 | R—NH_2 + OHC—N(C_2H_5)_2 + POCl_3 | 132 | 48 C / 4.9 H / 8.6 N | 48.4 / 4.7 / 8.2 |
| 25 | (M.W. 311) $CH_3$—C6H3(OCF_2CCl_2H)—N=CH—N(CH_3)_2 | 1 | R—NH_2 + OHC—N(CH_3)_2 + POCl_3 | 159 (1.2) | 46.2 C / 4.5 H | 45.5 / 4.5 |
| 26 | (M.W. 330.4) Cl—C6H3(OCF_2CCl_2H)—N=CH—N(CH_3)_2 | 1 | R—NH_2 + OHC—N(CH_3)_2 + POCl_3 | 164–165 (1.5) | 40 C / 3.3 H / 8.5 N | 40.3 / 3.6 / 8.5 |
| 27 | (M.W. 311) HCCl_2CF_2O—C6H3(CH_3)—N=CH—N(CH_3)_2 | 2 | R—NH_2 + OHC—N(CH_3)_2 + (CH_3O)_2SO_2 | 154–156 (0.1) | 9.0 N / 22.8 Cl | 9.0 / 22.7 |
| 28 | (M.W. 311) HCCl_2CF_2O—C6H3(CH_3)—N=CH—N(CH_3)_2 | 2 | R—NH_2 + OHC—N(CH_3)_2 + (CH_3O)_2SO_2 | 148 (0.2) | 9.0 N / 22.8 Cl | 8.9 / 22.6 |
| 29 | (M.W. 327) HCCl_2CF_2O—C6H3(OCH_3)—N=CH—N(CH_3)_2 | 2 | R—NH_2 + OHC—N(CH_3)_2 + (CH_3O)_2SO_2 | 184 | 8.6 N / 21.7 Cl | 8.7 / 21.5 |

Table—Continued

| No. | Final product | Prepared according to— | Reactants | B.P., °C. (mm. Hg) | Analysis Calc. | Analysis Found |
|---|---|---|---|---|---|---|
| 30 | (M.W. 384) HCCl₂CF₂S—⌬(Cl)—N=CH—N(CH₃)₂ ·HCl | 1 | R—NH₂ + OHC—N(CH₃)₂ + POCl₃ | (b) | C 34.3<br>H 3.1 | 34.6<br>3.2 |
| 31 | (M.W. 214) HCF₂—⌬—N=CH—N(CH₃)₂ | 1 | R—NH₂ + OHC—N(CH₃)₂ + POCl₃ | 107–108 (0.01) | C 56<br>H 5.6<br>N 13.1 | 55.8<br>5.5<br>13.3 |
| 32 | (M.W. 242) HCF₂—O—⌬—N=CH—N(C₂H₅)₂ | 1 | R—NH₂ + OHC—N(C₂H₅)₂ + POCl₃ | 115 (0.01) | C 59.4<br>H 6.6<br>N 11.6 | 59.3<br>6.8<br>11.8 |
| 33 | (M.W. 240) HCF₂—O—⌬—N=CH—N⟨pyrrolidine⟩ | 3 | R—N=CH—OCH₃ + HN⟨ ⟩ | 162 (1.8) | C 60<br>H 5.8<br>N 11.7 | 60.6<br>5.7<br>12.0 |
| 34 | (M.W. 254) HCF₂—O—⌬—N=CH—N⟨piperidine⟩ | 3 | R—N=CH—OCH₃ + HN⟨ ⟩ | 165 (1.5) | C 61.4<br>H 6.3<br>N 11 | 61.2<br>6.2<br>11.1 |
| 35 | (M.W. 268) HCF₂—O—⌬—N=CH—N⟨hexamethyleneimine⟩ | 3 | R—N=CH—OCH₃ + HN⟨ ⟩ | 175 (1.5) | C 62.6<br>H 6.7<br>N 10.7 | 62.6<br>7.0<br>10.4 |
| 36 | (M.W. 214) HCF₂O—⌬—N=CH—N(CH₃)₂ | 1 | R—NH₂ + OHC—N(CH₃)₂ + POCl₃ | 100–103 (0.07) | C 56<br>H 5.6<br>N 13.1 | 56.3<br>5.5<br>13.0 |
| 37 | (M.W. 248.5) Cl—⌬(HCF₂O)—N=CH—N(CH₃)₂ | 1 | R—NH₂ + OHC—N(CH₃)₂ + POCl₃ | 112–114 (0.01) | C 48.3<br>H 4.4<br>N 11.2 | 48.2<br>4.3<br>11.3 |
| 38 | (M.W. 248.5) HCF₂O—⌬(Cl)—N=CH—N(CH₃)₂ | 1 | R—NH₂ + OHC—N(CH₃)₂ + POCl₃ | 117 (0.01) | C 48.2<br>H 4.4<br>N 11.3 | 49.2<br>4.6<br>11.7 |
| 39 | (M.W. 228) CH₃—⌬(OCF₂H)—N=CH—N(CH₃)₂ | 1 | R—NH₂ + OHC—N(CH₃)₂ + POCl₃ | 135 (2.5) | C 57.8<br>H 6.1<br>N 12.3 | 57.8<br>6.2<br>12.2 |
| 40 | (M.W. 228) HCF₂O—⌬(CH₃)—N=CH—N(CH₃)₂ | 1 | R—NH₂ + OHC—N(CH₃)₂ + POCl₃ | 101 (0.01) | C 57.9<br>H 6.1<br>N 12.3 | 57.9<br>6.2<br>12.4 |
| 41 | (M.W. 284) HCF₂O—⌬(CH₃)—N=CH—N(C₃H₇)₂ | 3 | R—N=CH—OCH₃ + HN(C₃H₇)₂ | 120 (0.01) | C 63.3<br>H 7.8<br>N 9.9 | 63.5<br>7.9<br>9.8 |

Table—Continued

| No. | Final product | Prepared according to— | Reactants | B.P., °C. (mm. Hg) | Analysis Calc. | Analysis Found |
|---|---|---|---|---|---|---|
| 42 | (M.W. 262) $HCF_2O-\langle\bigcirc\rangle(CH_3)-N=CH-N\langle\bigcirc\rangle$ | 3 | $R-N=CH-OCH_3 + HN\langle\bigcirc\rangle$ | 148 (0.01) | 63.8 C 7.1 H 9.9 N | 63.5 6.7 9.9 |
| 43 | (M.W. 230) $H-CF_2-S-\langle\bigcirc\rangle-N=CH-N(CH_3)_2$ | 1 | $R-NH_2 + OHC-N(CH_3)_2 + POCl_3$ | 128 (0.01) | 52.2 C 5.2 H 12.2 N | 51.1 5.3 12.4 |
| 44 | (M.W. 244) $HCF_2S-\langle\bigcirc\rangle(CH_3)-N=CH-N(CH_3)_2$ | 1 | $R-NH_2 + OHC-N(CH_3)_2 + POCl_3$ | 165 (2.8) | 54.1 C 5.7 H 11.5 N | 54.4 5.9 11.8 |
| 45 | (M.W. 259) $HCCl=CClO-\langle\bigcirc\rangle(CH_3)-N=CH-N(CH_3)_2$ | 2 | $R-NH_2 + OHC-N(CH_3)_2 + (CH_3O)_2SO_2$ | 163 (0.5) | 10.8 N 27.4 Cl | 10.8 26.8 |
| 46 | (M.W. 259) $HCCl=CClO-\langle\bigcirc\rangle-N=CH-N(CH_3)_2$ | 2 | $R-NH_2 + OHC-N(CH_3)_2 + (CH_3O)_2SO_2$ | 137 (0.1) | 10.8 N 27.4 Cl | 10.8 27.0 |
| 47 | (M.W. 273) $HCCl=CClO-\langle\bigcirc\rangle(CH_3)(CH_3)-N=CH-N(CH_3)_2$ | 2 | $R-NH_2 + OHC-N(CH_3)_2 + (CH_3O)_2SO_2$ | 166 (0.4) | 10.2 N 26.0 Cl | 9.8 25.7 | a F.P.: 200-201.   b F.P.: 240-242.

EXAMPLES OF APPLICATION

EXAMPLE 48

A wettable powder easily dispersible in water is obtained by mixing 25 parts by weight of N-2-methyl-4-(1', 1', 2', 3', 3', 3'-hexafluoro-propoxy)-phenyl-N',N'-dimethylformamidine as active ingredient,
64 parts by weight of kaolin containing quartz as inert substance,
10 parts by weight of potassium salt of ligninsulfonic acid,
1 part by weight of sodium salt of oleylmethyltaurine as wetting and dispersing agent
and by grinding it in a disk attrition mill.

EXAMPLE 49

A dusting powder which is well suitable for application as weed killer is obtained by mixing 10 parts by weight of N-2-methyl-4-(1', 1', 2', 2'-tetrafluoroethoxy)-phenyl-N',N'-dimethyl-formamidine as active ingredient, and
90 parts by weight of talc as inert substance, and by grinding it in a cross beater mill.

EXAMPLE 50

An emulsifiable concentrate is composed of 15 parts by weight of N-2-methyl-4-(1', 1', 2'-trifluoro-2'-chloro-ethoxy)-phenyl-N',N'-dimethylformamidine,
75 parts by weight of cyclohexanone as solvent, and
10 parts by weight of nonylphenol (10 EO) as emulsifier.

EXAMPLE 51

A granulated product is composed of
2.5 parts by weight of N-2-methyl-4-(1', 1', 2'-trifluoro-2'-chloro-ethoxy)-phenyl-N'N'-dimethyl-formamidine,
0.5 part by weight of $SiO_2$,
1.8 part by weight of nonylphenol (10 EO) as emulsifier, and
95.2 parts by weight of sand as inert substance.

EXAMPLE 52

Vessels having a diameter of about 20 cm and a height of 25 cm were filled with earth, and Echinochloa crus-galli was sown into this earth. 3 days later, rice plants which were 3 weeks old were planted, and 1 week later, after the weeds had emerged, the vessels were charged with water in such a way that the water level was in the range of from 1 to 2 cm above the surface of the earth. The preparations

A

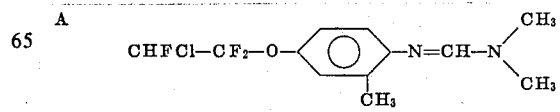

and respectively,

B 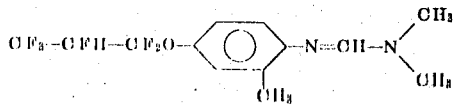

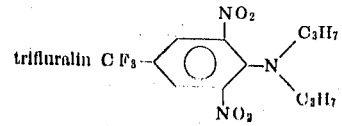

were introduced into this water in the form of granules. As comparative agents, two products well known in the practice of rice culture were used in the same manner, namely

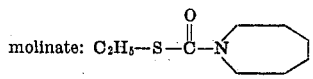

and

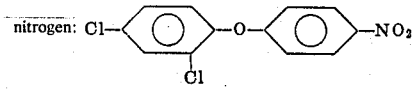

The vessels were stored in a greenhouse. 4 weeks after the treatment, the following results were obtained, expressed as degree of damage in percent (100 = complete kill, 0 = no damage).

|  |  | Rices | Echinochloa |
|---|---|---|---|
| preparation A | 0.3 kg/ha | 0 | 90 |
|  | 0.6 kg/ha | 0 | 100 |
|  | 1.2 kg/ha | 0 | 100 |
| preparation B | 0.3 kg/ha | 0 | 90 |
|  | 0.6 kg/ha | 0 | 95 |
|  | 1.2 kg/ha | 0 | 100 |
| molinate | 0.3 kg/ha | 0 | 70 |
|  | 0.6 kg/ha | 0 | 80 |
|  | 1.2 kg/ha | 10 | 95 |
| nitrogen | 0.3 kg/ha | 0 | 70 |
|  | 0.6 kg/ha | 0 | 85 |
|  | 1.2 kg/ha | 0 | 100 |

From this table results a clearly better activity of the preparations of the invention against Echinochloa crus-galli, which is one of the most important and most widely spread weeds in irrigated rice.

EXAMPLE 53

A mixture of weeds and some crop plants were sown in vessels having a dimension of 29 × 22 × 6 cm charged with earth, and the seeds were covered with earth. The same day, the active ingredient of preparation A cited in Example 52, which was emulsified in water, was sprayed on the surface of the soil. As comparative agent, was applied in the same manner. The vessels were stored in a greenhouse.

Four weeks after the treatment, the following results were stated, expressed as degree of damage in percent:

|  | preparation A | | | trifluralin | | |
|---|---|---|---|---|---|---|
| kg/ha: | 0.3 | 1.2 | 5.0 | 0.3 | 1.2 | 5.0 |
| Weed grasses | | | | | | |
| Digitaria sanguinalis | 100 | 100 | 100 | 80 | 100 | 100 |
| Echinochloa crus-galli | 100 | 100 | 100 | 40 | 100 | 100 |
| Eleusine indica | 100 | 100 | 100 | 95 | 100 | 100 |
| Leptochloa dubia | 100 | 100 | 100 | 100 | 100 | 100 |
| Panicum dichlotomiflorum | 100 | 100 | 100 | 90 | 100 | 100 |
| Setaria faberii | 100 | 100 | 100 | 100 | 100 | 100 |
| U.S. Broad-leaf weeds | | | | | | |
| Amaranthus retroflexus | 100 | 100 | 100 | 20 | 80 | 100 |
| Chenopodium album | 100 | 100 | 100 | 50 | 80 | 100 |
| Lespedeza stipulacea | 90 | 100 | 100 | 60 | 100 | 100 |
| Anoda cristata | 95 | 100 | 100 | 40 | 70 | 95 |
| Sida spinosa | 100 | 100 | 100 | 50 | 80 | 100 |
| Datura stramonium | 70 | 100 | 100 | 0 | 40 | 80 |
| U.S. Crop plants | | | | | | |
| peanut | 0 | 0 | 10 | 0 | 0 | 10 |
| soybean | 0 | 10 | 90 | 0 | 0 | 70 |
| cotton | 0 | 0 | 15 | 0 | 10 | 40 |

These results show that the product according to the invention has a slightly better effect against weed grasses than trifluralin, its activity against broad-leaf weeds is clearly better than that of trifluralin. Simultaneously, there is a good to very good preserving effect for the crop plants peanut, soybean and cotton; the product of the invention being far superior to trifluralin with respect to the sparing of cotton.

EXAMPLE 54

The preparations A and B cited in Example 52 as well as a series of other substances were examined according to analogous processes in weeds and crop plants. Besides A and B, the results of the preparations of the invention C 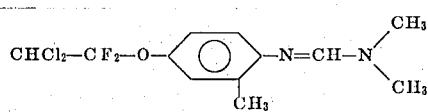

D 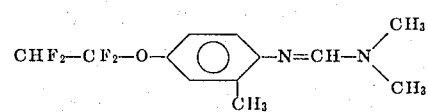

E 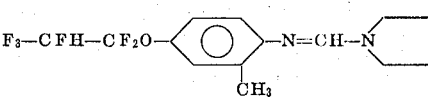

are listed; the dosage being 1.2 kg/ha in each case.

| | A | B | C | D | E |
|---|---|---|---|---|---|
| Weed grasses and weeds | | | | | |
| Digitaria sanguinalis | 100 | 100 | 95 | 85 | 100 |
| Alopecurus myosuroides | 90 | 80 | 90 | 75 | 100 |
| Amaranthus retroflexus | 100 | 95 | 100 | 100 | 50 |
| Stellaria media | 100 | 100 | 95 | 85 | 60 |
| Sinapis arvensis | 95 | 85 | 80 | 80 | 60 |
| Viola tricolor | 100 | 90 | 100 | 85 | 50 |
| Chrysanthemum segetum | 100 | 90 | 100 | 100 | 80 |
| Echinochloa crus-galli | 100 | 100 | 100 | 100 | 100 |
| Crop plants | | | | | |
| wheat | 10 | 0 | 20 | 0 | 10 |
| barley | 15 | 0 | 10 | 10 | 10 |
| corn | 20 | 10 | 15 | 0 | 0 |
| rice | 0 | 10 | 0 | 0 | 10 |
| sugar beet | 10 | 20 | 0 | 15 | 0 |
| sunflower | 0 | 0 | 10 | 0 | 0 |
| dwarf bush bean | 0 | 0 | 0 | 10 | 0 |
| pea | 0 | 0 | 0 | 0 | 0 |
| cotton | 0 | 0 | 0 | 10 | 0 |

EXAMPLE 55

Furthermore, also other preparations of the invention were examined with respect to their activity against different weeds. Thus, it was found for example that the following substances

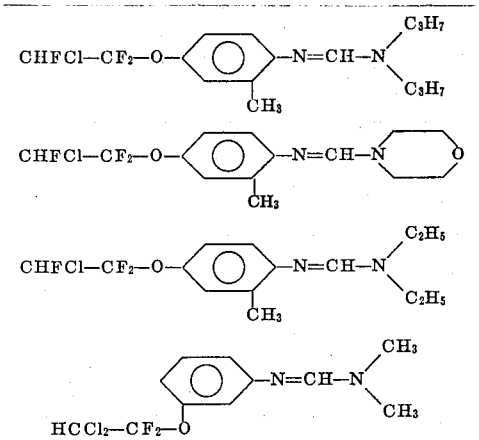

killed completely or nearly completely the following weeds:
Echinochloa crus-galli
Digitaria sanguinalis
Setaria faberii
Poa annua
Anthemis arvensis
Amaranthus retroflexus and
Stellaria media
when used in doses of from 1.2 to 2.5 kg/ha.

What is claimed is:
1. A Compound of the formula

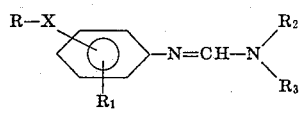

in which
R is an alkyl radical of from 1 to 3 carbon atoms or an alkenyl radical of 2 carbon atoms containing at least one chlorine or fluorine atom linked to each carbon atom, said radical R further containing at least one hydrogen atom;
$R_1$ is hydrogen, chlorine, methyl, methoxy, or trifluoromethyl;
$R_2$ and $R_3$ each is alkyl having from 1 to 3 carbon atoms; or
$R_2$ and $R_3$ together represent an alkylene or an oxalkylene of from 4 to 6 carbon atoms, and
X is oxygen or sulfur;
or the hydrochloride, sulfate, nitrate, chlorate, perchlorate or phosphate salt thereof.
2. The compound of claim 1 in which R is $CF_3CFHCF_2-$, $CHF_2CF_2-$, $CHFClCF_2-$, $CHCl_2CF_2-$, $CHF_2-$ or $CHCl=CCl-$.
3. The compound of claim 1 which is N-2-methyl4-(1′,1′,2′,3′,3′,3′-hexafluoropropoxy)-phenyl-N′,N′-dimethylformamidine.
4. The compound of claim 1 which is N-2-methyl4-(1′, 1′, 2′, 2′-tetrafluoroethoxy)-phenyl-N′,N′-dimethylformamidine.
5. The compound of claim 1 which is N-2-methyl4-(1′,1′,2′,3′,3′,3′-hexafluoropropoxy)-phenyl-N′,N′-pentamethylene-formamidine.
6. The compound of claim 1 which is N-2-methyl4-(1′, 1′, 2′-trifluoro-2′-chloroethoxy)-phenyl-N′,N′dimethylformamidine.
7. The compound of claim 1 which is N-2-methyl4-(1′, 1′-difluoro-2′,2′-dichloroethoxy)-phenyl-N′,N′dimethylformamidine.
8. The compound of claim 1 which is N-2-methyl-4-(1′, 1′, 2′-trifluoro-2′-chloroethoxy)-phenyl-N′,N′dipropylformamidine.
9. The compound of claim 1 which is N-2-methyl4-(1′, 1′, 2′-trifluoro-2′-chloroethoxy)-phenyl-N′,N′diethylformamidine.
10. The compound of claim 1 which is N-4(1′,1′-difluoro-2′,2′-dichloroethoxy)-phenyl-N′,N′-dimethylformamidine.
11. The compound of claim 1 which is N-2-methyl4(1′, 1′, 2′-trifluoro-2′-chloroethoxy)-phenyl-N′,N′-(3-oxa-pentamethylene)formamidine.

* * * * *